INVENTOR
JOHN F. RIDER
BY John J. Logan
ATTORNEY

Patented Nov. 15, 1949

2,488,328

UNITED STATES PATENT OFFICE 2,488,328

COMPOSITE TEST PROBE FOR RADIO APPARATUS AND THE LIKE

John Francis Rider, New York, N. Y.

Application June 12, 1946, Serial No. 676,315

3 Claims. (Cl. 175—183)

This invention relates to test probes and more particularly to probes for contacting and testing parts and conditions of radio apparatus and the like.

The invention is in the nature of an improvement on the type of probe disclosed in U. S. Patent #2,227,381. There is disclosed in Patent #2,227,381 an arrangement for connecting a test unit to a radio receiver or the like, while the latter is in operation and without affecting normal operation of the receiver. In order to test the receiver for different conditions, it was necessary to employ different types of probes. For example, in testing the tuned circuit portions of the receiver, it was necessary to employ a capacity probe which insulated the test instrument from the receiver so far as D. C. is concerned, but allowed the high frequency currents to pass to the test instrument. When a low frequency or conductivity condition was to be tested, a D. C. conductive probe was substituted for the capacity probe. One of the most annoying conditions met with in testing such devices as radio receivers, is the presence of a momentary unstandard condition whose duration may be extremely short and which do not occur with any predictable regularity. It has been found that when using two different types of probes, the interval during which one probe is being replaced by the other, may be of such duration that the unstandard condition changes. Thus, apart from their expense the use of duplicate probes materially increases the testing time and complexity. This problem is even further aggravated when testing such devices as ultra high frequency systems. The ordinary capacity probe may have such a high capacity to ground as to vitiate the accuracy of the test results.

Accordingly, one of the principal objects of this invention is to provide a test probe which can be substantially instantaneously converted from a low frequency or D. C. test probe, to a high frequency or capacity probe.

Another object is to provide a composite conductivity and high frequency test probe which is particularly suitable for testing ultra high frequency equipment, wherein the frequency may be of the order of several hundreds or more megacycles per second.

A feature of the invention relates to a composite test probe having a specially designed probe head, in conjunction with an instantaneously shiftable member cooperating with the head to convert the probe from a conductivity probe to a capacity probe.

Another feature relates to a novel composite test probe having a specially designed probe head for enabling the coupling capacity of the probe to be readily changed, and also for readily converting the probe from a conductivity probe to a capacity probe.

A further feature relates to the novel organization, arrangement and relative location and proportioning of parts which cooperate to provide an improved test probe for radio apparatus and the like.

In the drawing which shows one preferred embodiment,

Figure 1:
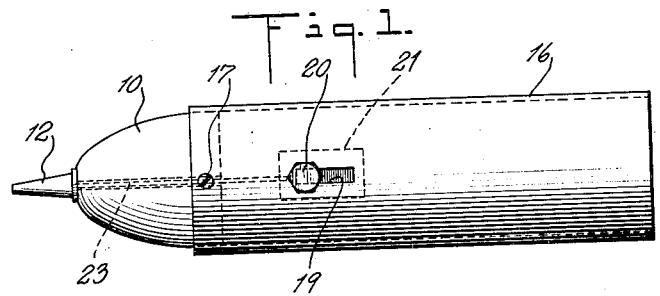
Fig. 1 is a plan view of a composite test probe according to the invention.

The composite probe comprises a header consisting of a smoothly rounded block 10 of insulation material which has extremely low dielectric losses particularly at very high frequencies. For example, block 10 may be of "Isolantite." Header 10 has an axial bore 11 into the forward end of which is threaded a tapered metal prong or probe point 12. Prong 12 has its inner end threaded into the bore 11, and has a peripheral flange which seats against the flattened end of block 10. Another metal rod 13 is threaded into the composite end of bore 11 until its head 14 abuts against the flat face of member 10. There is thus left between the adjacent ends of members 12 and 13 a small air gap which acts as a dielectric. The opposing ends of members 12 and 13 provide, in conjunction with the said air dielectric, a small coupling condenser whereby the device which is in contact with the point of member 12, is electrostatically coupled to the conductor 15, and thence to a suitable test instrument such as an electronic volt meter or the like. The capacity coupling between members 12 and 13 is therefore so small as not to alter to any appreciable extent the electric parameters of the device or system to which member 12 is applied. This is of great importance in testing present day ultra high frequency circuits. Furthermore, by the particular arrangement and shape of parts 10, 11 and 12, the shunt capacity between point 12 and ground is of such a low order as to be entirely negligible in the test results.

Figure 2:
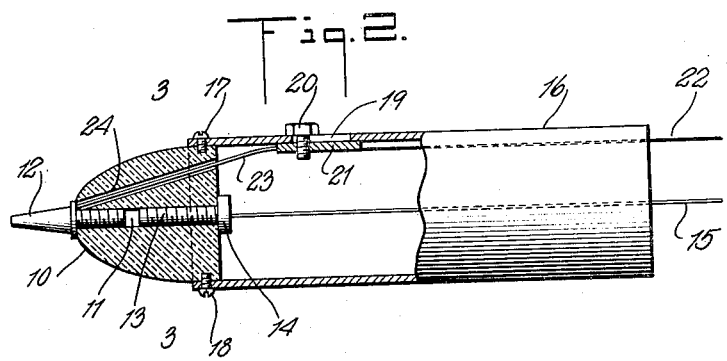
Fig. 2 is a front view of Fig. 1, partly in sectional form, taken along the median line.
Figure 3:
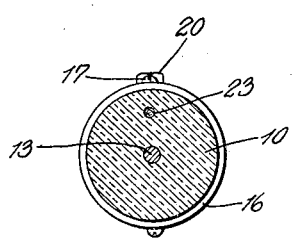
Fig. 3 is a section of Fig. 2, taken along the line 3—3 and viewed in the direction of the arrows.

The header 10 is fitted into the left-hand end of a tubular metal gripping member or handle 16, to which it is removably fastened by screws 17, 18. Member 16 adjacent its forward end has a slot 19, in which rides a thumb screw 20. Fastened to screw 20 interiorly of member 16 is a metal slider 21, to which a conductor 22 is electrically connected. The opposite end of slider 21 has conductively fastened thereto a flexible or springy wire 23, which passes through a somewhat larger channel or bore 24 in the header 10. The wire 23 is of such a length that when the slider 21 is pushed towards the front of the probe, the left-hand end of wire 24 firmly contacts with the member 12, thus providing a completely conductive connection between the probe point 12 and the conductor 22. When the slider 21 is pushed back to the right-hand position as viewed in Fig. 2, the wire 24 disengages the member 12 and the latter is therefore coupled to the conductor 15 by the electrostatic coupling between the opposing ends of members 12 and 13 as above described. Since the thumb screw 20 is located towards one end of the device, it is possible to grip the handle 16, and by means of the thumb the change from a capacity condition to a conductive condition can be instantaneously effected. Thus, the probe can be used to test almost instantaneously D. C. conditions and A. C. conditions in the device under the test. Preferably, the slider 21 is held in place against the inner surface of member 16 with sufficient frictional force so that when the slider is pushed to its forward or rear position, it is frictionally held in that position.

While one particular embodiment has been disclosed herein, it will be understood that various changes and modifications may be made therein without departing from the spirit and scope of the invention. For example, a take-up washer or plurality of washers may be provided between the flange of member 12 and the end of member 10 to increase the dielectric spacing between the spaced threaded ends of members 12 and 13.

What is claimed is:

1. A composite test probe of the type described, comprising a header of insulating material having an axial bore, a metallic probe member having one end threaded into said bore and with the opposite end extending outwardly from said header, another metal member threaded into said bore in spaced relation to the probe member to provide a coupling capacity therebetween and housed entirely within said header, a tubular metal member in one end of which said header is fastened to extend outwardly thereof, a slot in the wall of said tubular member, a slide member mounted inside said tubular member in registry with said slot, means fastened to said slide member and extending through said slot to provide external adjusting means for said slide, said header having a passageway communicating at its forward end with said probe which passageway is separate from said bore, and a spring contact member connected to said slide and slidable in said header for engagement with and disengagement from said probe member in response to movement of said adjusting means.

2. A composite conductivity and capacity type probe for testing radio circuits, comprising a tubular holder, a header of insulation material fitted into one end of said holder and extending outwardly from said one end, a pair of spaced metal members mounted within a bore in said header and having their adjacent ends in spaced relation within the header to provide a coupling capacity housed entirely within the header, one of said metal members extending outwardly of the header to form a contact probe point, a lead-in wire fastened to the other metal member and extending through said holder, said header having a passage extending therethrough at an angle to the central longitudinal axis of said header and separate from said bore and communicating with said one metal member, a contact finger having one end adjustably supported from said tubular holder and passing through said passage, and means attached to said one end of said finger and slidably mounted on said holder for moving said finger to one position in which the end of said finger is in conductive contact with said one of said metal members and in the other position it is disconnected from said one of said metal members.

3. A composite conductivity and capacity type probe for testing electrical circuits, comprising a header of insulating material, a tubular metal grip member in one end of which said header is mounted and from which said header extends outwardly, said header having a central bore, a metallic probe member fastened in one end of said bore and extending outwardly from said header, a metallic rod-like member fastened in the opposite end of said bore in spaced relation to said probe member to provide a predetermined coupling capacity therebetween and located entirely within said header, a passageway through said header to provide a communicating path to said probe through said header separate from said bore, a slider member mounted on the wall of said tubular gripping member, and a contact finger electrically attached at one end to said slider member and passing through said passageway and adapted to be pushed by said slider into electrical contact with said probe member when said slide is moved towards said header.

JOHN FRANCIS RIDER.

REFERENCES CITED

The following references are of record in the file of this patent:

UNITED STATES PATENTS

| Number | Name | Date |
|---|---|---|
| 1,592,554 | Burns | July 13, 1926 |
| 2,227,381 | Rider et al. | Dec. 31, 1940 |
| 2,231,660 | Carlotti et al. | Feb. 11, 1941 |

OTHER REFERENCES

Radio News, January 1944, pages 36, 37, 82, 84 and 86.